UNITED STATES PATENT OFFICE.

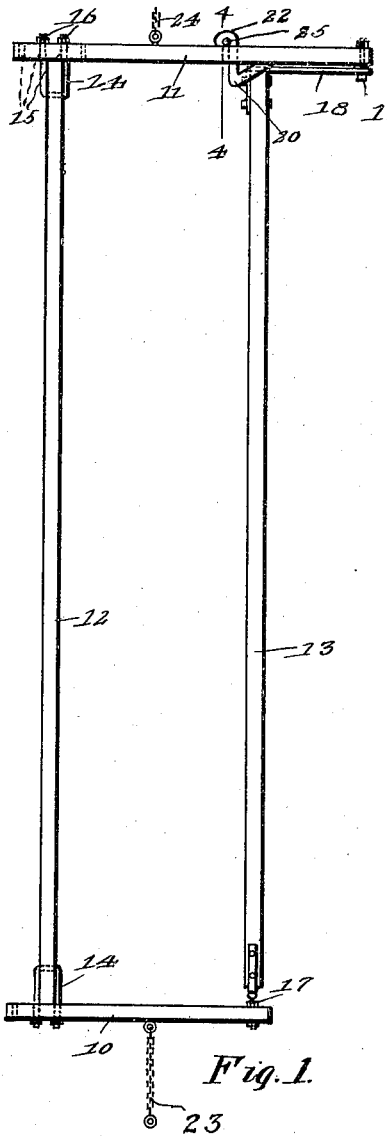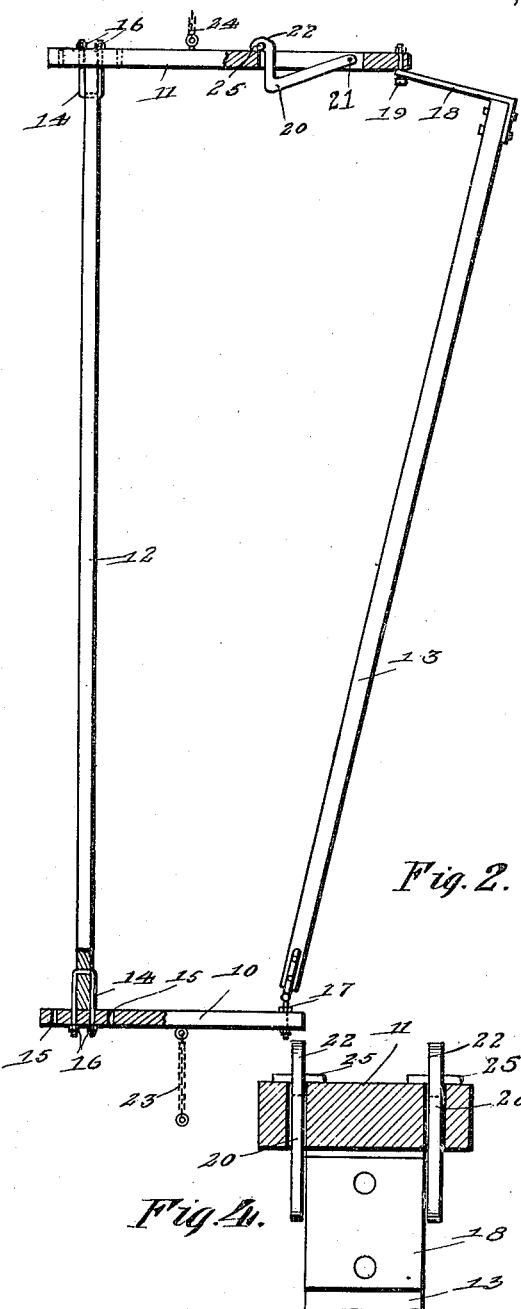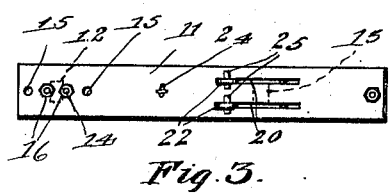

EDWARD RENNOLD TESKE, OF OAKFIELD, WISCONSIN.

CATTLE-STANCHION.

1,320,943. Specification of Letters Patent. Patented Nov. 4, 1919.

Application filed March 22, 1919. Serial No. 284,262.

*To all whom it may concern:*

Be it known that I, EDWARD R. TESKE, a citizen of the United States, residing at Oakfield, in the county of Fond du Lac and State of Wisconsin, have invented new and useful Improvements in Cattle-Stanchions, of which the following is a specification.

This invention relates to cattle stanchions and has for its object the provision of a stanchion which is suspended and secured by means of rails whereby the stanchion may have pivotal movement to accommodate itself to the movement of the animal engaged therein, the stanchion being further adjustable for animals of different sizes and having one side removably mounted whereby it may be swung to permit disengagement from the neck of the animal.

An important object is the provision of a stanchion of this character in which the movable bar is held in locked position by a peculiarly arranged gravity operated locking means and in which outward movement of the movable bar is limited.

A further object is the provision of a stanchion of this character which will be simple and inexpensive in manufacture, highly efficient and durable in use, and a general improvement in the art.

With the above and other objects and advantages in view, the invention consists in the details of construction to be hereinafter more fully described and claimed, and illustrated in the accompanying drawing, in which Figure 1 is a front elevation of a stanchion constructed in accordance with my invention, showing it closed, Fig. 2 is a similar view showing the movable bar swung to open position, and parts being broken away and in section, Fig. 3 is a plan view and Fig. 4 is a detail cross sectional view taken on the line 4—4 of Fig. 1 through the upper bar showing the locking means.

Referring more particularly to the drawing, the numeral 10 designates the base bar, 11 designates the top bar, and the numerals 12 and 13 designates the fixed and movable bars, respectively. The bar 12 carries at its ends U-shaped bolts 14 which have their arms disposable through selected ones of a plurality of openings 15 formed in the bars 10 and 11 whereby the distance between the bars 12 and 13 may be varied to suit animals of different sizes or having necks of different thicknesses. Clamping nuts 16 are provided upon the ends of the U-shaped bolts 14 for securing these bolts in position.

The movable bar 13 is connected with the bar 10 by means of a swiveled bolt 17 whereby the bar 13 may have revoluble and also tilting movement with respect to the bar 10. At its upper end the bar 13 has secured thereon, a right angularly extending bracket 18 which is loosely secured to the bar 11 by a bolt 19 whereby the bar 13 and bracket 18 may swing together upon the bolt 19.

The locking means for the upper end of the bar 13 comprises a pair of angular dogs 20, pivoted, as at 21, upon opposite sides of the bar 11 and projecting normally below the lower surface of the bar 11. These dogs 20 are provided at their upper ends with finger engaging portions 22 by means of which either one may be grasped and swung on its pivot.

The entire device is secured in position within a stable or the like by means of chains 23 and 24 which are connected respectively, with the bars 10 and 11 to any suitable rigid support within the stables or other building whereby the entire stanchion may have revoluble movement to accommodate itself to movements of the animal engaged therein, within reasonable limits.

In the operation of the device, the movable bar 13 being in closed position, as shown in Fig. 1, in order to release an animal engaged within the stanchion, it is necessary that the operator grasp the finger engaging portion 22 of either of the dogs 20 and elevate the dog whereby it will be raised out of engagement with the side of the bar 13. The bar 13 may then be swung upon the bolt 17 as a pivot into the position shown in Fig. 2, permitting the animal to remove his head from between the bars 12 and 13. It will be noted that outward swinging movement of the bar 13 will be limited owing to the connection of the bracket 18 with the bar 13 and bar 11. The stanchion being in open position, in order to close it, it is necessary that the operator grasp the bar 13 and swing it in either direction and lift the proper one of the dogs 20 so that the upper end of the bar 13 may be positioned immediately under the bar 11 whereupon the operator releases the dog which will then drop so that it will be disposed against the side of the bar 13. It is understood of course that when the stanchion is in closed position, the dogs 20 will be disposed in straddling relation to the bar 13. Any suitable means, such as a pin, or the like, 25 may be provided in the finger engaging portions 22 for preventing the dogs from swinging downwardly too far.

From the foregoing description and a study of the drawing it will be apparent that I have thus provided a very simply constructed stanchion which is not likely to become deranged by movements of an animal or a careless operator, which is so constructed that it may be moved to open or closed position with the utmost ease, and which may be adjusted to fit animals of different sizes.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. A stanchion comprising spaced top and bottom bars, a relatively stationary side bar connecting said top and bottom bars, a movable bar swingably and tiltably connected at one end with said bottom bar, a bracket secured upon the upper end of said movable bar and pivotally connected with said top bar, and a pair of latch dogs pivoted upon said top bar at opposite sides thereof and normally engaging the sides of said movable bar, upward movement of either dog permitting swinging movement of said movable bar.

2. A cattle stanchion comprising top and bottom bars, a relatively stationary side bar disposed between and connecting said top and bottom bars, a movable side bar swingably and tiltably connected at its lower end with said bottom bar, a right angularly extending bracket secured upon the upper end of said movable bar, a pair of dogs pivoted upon opposite sides of said top bar and extending below the lower surface thereof for engagement upon opposite sides of said movable bar, finger engaging portions formed on the upper ends of said dogs, and stops for limiting downward movement of said dogs, elevation of either of said dogs permitting disengagement and outward swinging of said movable bar.

In testimony whereof I affix my signature.

EDWARD RENNOLD TESKE.

Copies of this patent may be obtained for five cents each, by addressing the "Commissioner of Patents, Washington, D. C."